United States Patent
Yano et al.

(10) Patent No.: US 8,159,506 B2
(45) Date of Patent: Apr. 17, 2012

(54) USER INTERFACE DEVICE AND IMAGE DISPLAYING METHOD

(75) Inventors: Takashi Yano, Tokyo (JP); Iwao Saeki, Kanagawa (JP); Tetsuya Sakayori, Tokyo (JP); Yoshifumi Sakuramata, Tokyo (JP); Haruo Shida, Kanagawa (JP); Junichi Takami, Kanagawa (JP); Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1093 days.

(21) Appl. No.: 11/639,508

(22) Filed: Dec. 14, 2006

(65) Prior Publication Data

US 2007/0157084 A1 Jul. 5, 2007

(30) Foreign Application Priority Data

Dec. 27, 2005 (JP) ................................ 2005-375832
Oct. 2, 2006 (JP) ................................ 2006-270784

(51) Int. Cl.
*G09G 5/00* (2006.01)

(52) U.S. Cl. ........ 345/649; 345/418; 345/440; 345/581; 345/173; 345/165; 345/650; 345/658; 358/1.1; 358/1.18; 715/700; 715/764; 715/838; 715/810; 715/762

(58) Field of Classification Search .................. 715/527, 715/700, 764, 838, 810, 762; 345/619–689, 345/418, 440, 581, 173, 156; 358/1.1, 1.18
See application file for complete search history.

(56) References Cited

U.S. PATENT DOCUMENTS

| | | | | |
|---|---|---|---|---|
| 5,347,351 A * | 9/1994 | Morita et al. | .................... | 399/82 |
| 5,359,677 A * | 10/1994 | Katsurada et al. | ............ | 382/290 |
| 5,732,230 A * | 3/1998 | Cullen et al. | .................. | 715/764 |
| 5,839,019 A * | 11/1998 | Ito | ..................................... | 399/45 |
| 5,963,216 A * | 10/1999 | Chiarabini et al. | ............ | 345/660 |
| 5,999,767 A * | 12/1999 | Ando | ............................. | 399/85 |
| 6,029,026 A * | 2/2000 | Natsume et al. | ................ | 399/82 |
| 6,088,568 A * | 7/2000 | Ohtani | .......................... | 399/408 |
| 6,091,929 A * | 7/2000 | Yamazaki et al. | ............ | 399/410 |
| 6,144,777 A * | 11/2000 | Tada et al. | ...................... | 382/284 |
| 6,144,818 A * | 11/2000 | Ohtani | ............................ | 399/81 |
| 6,157,439 A * | 12/2000 | Rousseau et al. | ............... | 355/61 |
| 6,215,977 B1* | 4/2001 | Otani | ............................ | 399/407 |
| 6,313,923 B1* | 11/2001 | Takanashi et al. | ........... | 358/1.18 |
| 6,415,117 B1* | 7/2002 | Bates et al. | ...................... | 399/84 |
| 6,427,058 B1* | 7/2002 | Akiba et al. | ..................... | 399/82 |
| 6,427,997 B1* | 8/2002 | Hirota et al. | ............... | 270/58.12 |
| 6,430,389 B1* | 8/2002 | Kimura | .......................... | 399/410 |
| 6,473,196 B2* | 10/2002 | Usami et al. | ................. | 358/1.18 |
| 6,661,530 B1* | 12/2003 | Munetomo et al. | .......... | 358/1.15 |
| 6,701,011 B1* | 3/2004 | Nakajima | ...................... | 382/167 |
| 6,711,365 B2* | 3/2004 | Ohtani | ............................ | 399/82 |
| 6,799,006 B2* | 9/2004 | Ohtani | ............................ | 399/82 |
| 6,851,875 B2* | 2/2005 | Shiragami | ....................... | 400/76 |

(Continued)

FOREIGN PATENT DOCUMENTS

JP 11-234503 8/1999

(Continued)

*Primary Examiner* — Andrew Wang
*Assistant Examiner* — Abderrahim Merouan
(74) *Attorney, Agent, or Firm* — Cooper & Dunham LLP

(57) ABSTRACT

An operation displaying unit displays thereon a preview image of input information. A receiving unit receives a request for rotating displayed preview image. A processing unit rotates the displayed preview image in response to received request for rotating the displayed preview image, and displays rotated preview image on the operation displaying unit.

19 Claims, 14 Drawing Sheets

U.S. PATENT DOCUMENTS

| | | | |
|---|---|---|---|
| 7,002,700 B1* | 2/2006 | Motamed | 358/1.1 |
| 7,064,850 B1* | 6/2006 | Wheeler | 358/1.15 |
| 7,134,370 B2* | 11/2006 | Murata et al. | 83/13 |
| 7,161,711 B2* | 1/2007 | Mori et al. | 358/1.9 |
| 7,215,439 B2* | 5/2007 | Suzuki | 358/1.18 |
| 7,413,178 B2* | 8/2008 | Fujii et al. | 270/58.11 |
| 7,584,948 B2* | 9/2009 | Fujii et al. | 270/58.11 |
| 7,675,645 B2* | 3/2010 | Hara | 358/1.18 |
| 2001/0026699 A1* | 10/2001 | Ishikura | 399/81 |
| 2002/0026453 A1* | 2/2002 | Mori et al. | 707/104.1 |
| 2003/0103221 A1* | 6/2003 | Natori | 358/1.9 |
| 2003/0197894 A1* | 10/2003 | Miyamoto et al. | 358/1.18 |
| 2004/0090553 A1* | 5/2004 | Silverbrook | 348/375 |
| 2004/0125394 A1* | 7/2004 | Terao et al. | 358/1.13 |
| 2005/0099497 A1* | 5/2005 | Rogan et al. | 348/207.2 |
| 2006/0033956 A1* | 2/2006 | Takahashi | 358/1.15 |
| 2006/0103881 A1* | 5/2006 | Matsuda | 358/1.15 |
| 2006/0204269 A1* | 9/2006 | Nagata et al. | 399/82 |
| 2007/0070420 A1* | 3/2007 | Kizaki et al. | 358/1.15 |
| 2007/0109593 A1* | 5/2007 | Ohta et al. | 358/1.15 |
| 2008/0147347 A1* | 6/2008 | Shaw et al. | 702/108 |

FOREIGN PATENT DOCUMENTS

| | | |
|---|---|---|
| JP | 2002-103726 | 4/2002 |
| JP | 2003-5471 | 1/2003 |
| JP | 2006-3568 | 1/2006 |

* cited by examiner

FIG. 15

|  |  | LEFT END | | UPPER END | |
|---|---|---|---|---|---|
|  |  | ODD-NUMBERED PAGE | EVEN-NUMBERED PAGE | ODD-NUMBERED PAGE | EVEN-NUMBERED PAGE |
| PUNCH HOLE STAPLE | ORIENTATION | ○ | ○ | ○ | × |
|  | MIRROR IMAGE | × | ○ | × | ○ |
| BINDING MARGIN |  |  |  |  |  |

(NOTE)
ORIENTATION:
CIRCLE INDICATES UPSIDE UP AND DOWNSIDE DOWN
CROSS INDICATES UPSIDE DOWN AND DOWNSIDE UP

MIRROR IMAGE:
CROSS INDICATES NON-MIRROR IMAGE DISPLAY
CIRCLE INDICATES MIRROR IMAGE DISPLAY

USER INTERFACE DEVICE AND IMAGE DISPLAYING METHOD

CROSS-REFERENCE TO RELATED APPLICATIONS

The present document incorporates by reference the entire contents of Japanese priority documents, 2005-375832 filed in Japan on Dec. 27, 2005 and 2006-270784 filed in Japan on Oct. 2, 2006.

BACKGROUND

1. Technical Field

This disclosure relates to a user interface device and an image displaying method.

2. Description of the Related Art

Conventionally, in image processing apparatuses, such as copiers, facsimiles, and printers, a user selects a function desired to be executed from out of functions of an image processing apparatus, and sets the function as desired. For example, the apparatus is configured to receive settings, including those regarding the type and state, such as density, of a document, those regarding various image processing, such as image enlargement/reduction, single-side/duplex printing, and margin size, and those regarding post-processing, such as sorting, stapling, and hole punching.

To let the user set these various settings, the conventional image processing apparatus provides many setting items, and the user has to perform a setting operation so as to obtain an intended process result from out of these many stetting items.

However, in the conventional image processing apparatus, a final process result that will be obtained from the setting, for example, a printing result, cannot be known until an actual printout is obtained, thereby often leading to an unexpected finish.

To get around this problem, a preview displaying apparatus has been suggested that displays a preview image indicative of the state of a print result (see Japanese Patent Application Laid-Open No. 2003-5471). Also, an image processing apparatus has been suggested that displays a preview image in a state where image data is printed on a sheet corresponding to a piece of sheet image data selected from out of pieces of sheet image data with different sheet qualities (see Japanese Patent Application Laid-Open No. 2002-103726). Furthermore, an image forming system has been suggested that combines a plurality of pieces of edited image data for preview display (see Japanese Patent Application Laid-Open No. 11-234503).

In these conventional technologies, images obtained as the process results of image processing according to settings are displayed one by one or in a combined manner for preview display. By performing operations, such as viewing such a preview and an image and performing a resetting operation, a finish state is checked before printout to perform a setting operation, thereby obtaining an intended image output.

In Japanese Patent Application Laid-Open No. 2003-5471, Japanese Patent Application Laid-Open No. 2002-103726, and Japanese Patent Application Laid-Open No. 11-234503, a preview display is performed by reading a document. However, at the time of printout, if the direction of reading the document does not match the orientation of images to be printed, even with taking the trouble of reading the document for printing, what is obtained is a misbound document with sheets bound in upside down, and the entire printing goes to waste. For this reason, when an orientation mismatch is found after checking a preview image, the document has to be read again. Specifically, the following problem has occurred.

FIG. 18 is a drawing for explaining the case where a document is read by a conventional image forming apparatus for combined printing. FIG. 19 is a drawing for explaining the case where a document is read by conventional image forming apparatus for duplex printing. As depicted in FIG. 18, when preview images 1611 to 1614 obtained by reading a document are reduced as they are for combined printing, the results are preview images 1621 and 1622. When they are output, the results are preview images 1631 and 1632 in which pages are arranged horizontally in reverse order.

Moreover, as depicted in FIG. 19, when preview images 1711 to 1714 obtained by reading a document are subjected to duplex printing as they are, the results are preview images 1721 and 1722. When they are output, the results are preview images 1731 and 1732 in which some pages are arranged upside down. In these conventional technologies, the problems as mentioned above occur because the orientation of the document is not recognized. Furthermore, these problems occur because of no presentation of an input for correcting the orientation by the operator, thereby leading to a process with the orientation left incorrect.

BRIEF SUMMARY

In an aspect of this disclosure, there is provided a user interface device that includes an operation displaying unit that displays thereon a preview image of input information; a receiving unit that receives a request for rotating displayed preview image; and a processing unit that rotates the displayed preview image in response to received request for rotating the displayed preview image, and displays rotated preview image on the operation displaying unit.

A method of displaying an image in a user interface device, according to another aspect of this disclosure, includes operation displaying including an operation displaying unit displaying thereon a preview image of input information; receiving a request for rotating displayed preview image; and processing including a processing unit rotating the displayed preview image in response to received request for rotating the displayed preview image, and the processing unit displaying rotated preview image on the operation displaying unit.

The above and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 15 is a schematic drawing of a relation table that determines a preview image process correspondingly to duplex printing and a post-printing process item;

DETAILED DESCRIPTION OF THE PREFERRED EMBODIMENTS

Exemplary embodiments according to the present invention are described in detail below with reference to the accompanying drawings.

A user interface device according to a first embodiment of the present invention displays input information read by an image forming apparatus as a preview image, presents a check whether the vertical orientation of a document image is correct, receives a rotation process, and then displays again the rotated image after the process. This makes it possible for the operator to prevent a waste due to an erroneous operation of reading a document image and printing the document with its orientation left incorrect.

Figure 1:
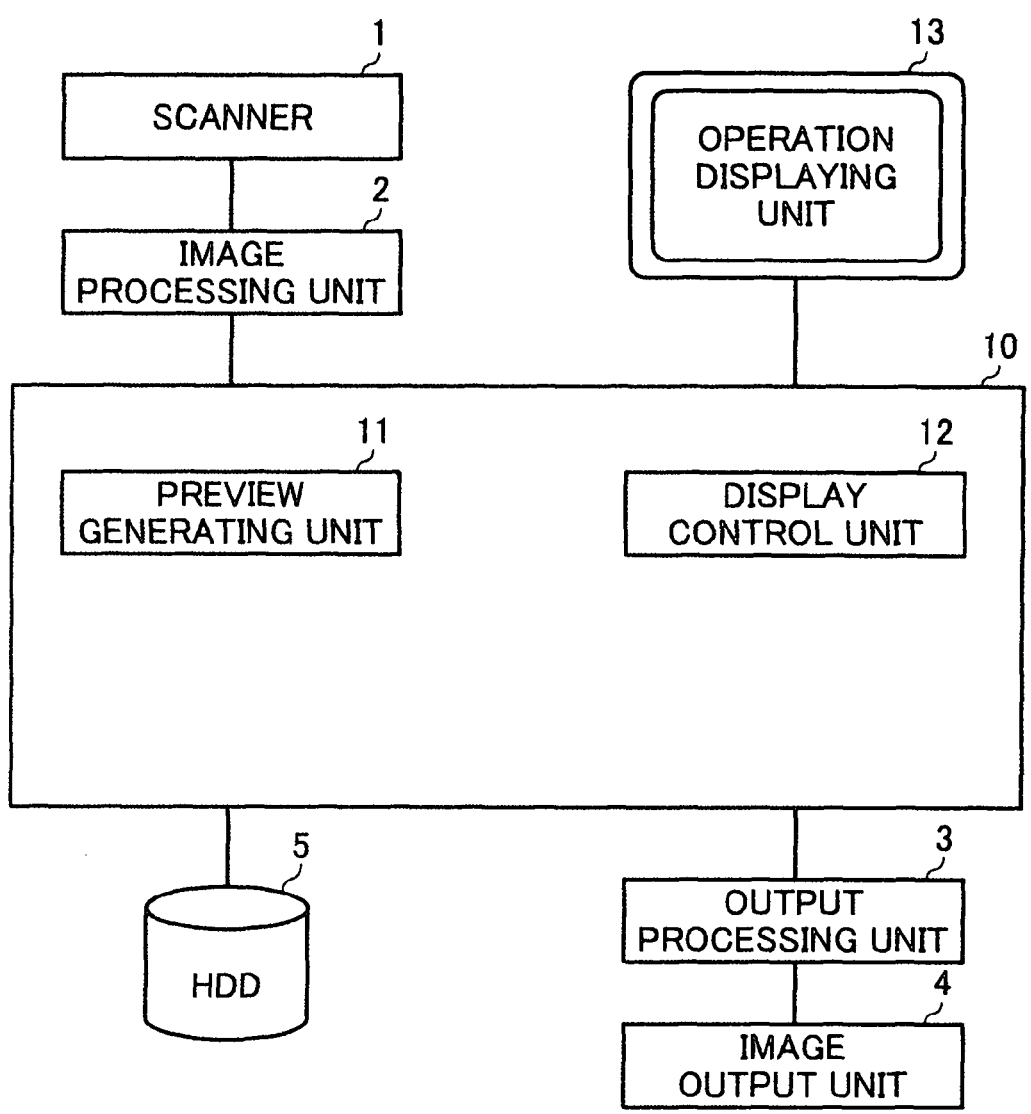
FIG. 1 is a functional block diagram of an image forming apparatus having included therein a user interface device according to a first embodiment of the present invention.

FIG. 1 is a functional block diagram of an image forming apparatus having included therein the user interface device according to the first embodiment. The image forming apparatus includes a scanner 1, an image processing unit 2, an output processing unit 3, an image output unit 4, a hard disk drive (HDD) 5, and a user interface device 10.

The scanner 1 reads a document image. The scanner 1 irradiates a document moving in a sub-scanning direction with reading light, and performs optical-electrical conversion with an optical-electrical converting element, such as a charge coupled device (CCD), thereby reading the document image. When an automatic document feeder (ADF) that feeds a plurality of sheets of a document one by one is provided, the scanner 1 reads the sheets of the document fed from the ADF as analog image data, and then transmits the analog data to the image processing unit 2.

The image processing unit 2 receives the analog data obtained through reading by the scanner 1, converts it to digital image data for output to the HDD 5, and transmits the digital image data to the user interface device 10.

The HDD 5 is an image storage unit, classifying the image data obtained through reading by the scanner 1 by file for storage. The HDD 5 can be substituted with a large-capacity random access memory (RAM).

The user interface device 10 receives an input of the image information obtained through reading by the scanner, displays it as a preview image, receives a rotation process, and then displays again the preview image after the process. Also, the user interface device 10 receives various process settings regarding image output.

The output processing unit 3 performs an output process on the input image data based on the process settings received by the user interface device 10. Also, the output processing unit 3 performs required image processing, such as gamma conversion, on the image data. The image output unit 4 produces an image output according to the settings in the output process performed by the output processing unit 3. Here, the output process performed by the image output unit 4 includes not only a process of forming an image on an output sheet for image output but also a post-printing process, such as stapling or hole punching.

The user interface device 10 according to the first embodiment includes a preview generating unit 11, a display control unit 12, and an operation displaying unit 13.

The preview generating unit 11 generates preview image information from the image information obtained through reading by the scanner for display on the operation displaying unit 13. Also, the preview generating unit 11 generates information for check whether to perform a rotation process on the preview image. The preview image is generated by, for example, decimating the input image information so that the information has an amount of information only for display on the operation displaying unit 13. The preview generating unit 11 stores the generated preview image information in the HDD 5.

The display control unit 12 causes the preview check information and the rotation-process check information both generated by the preview generating unit 11 to be displayed on the operation displaying unit 13. Here, the rotation-process check information may be represented by a display by characters as "Do you want to rotate?" or a display designed in an icon shape, which is hereinafter referred to as a check icon.

The operation displaying unit 13 displays the preview image information generated by the preview generating unit 11. Also, the operation displaying unit 13 receives a specification of rotation or non-rotation through a touch input from the displayed check icon.

The operation displaying unit 13 is implemented by, for example, a liquid crystal display, and can be configured with a touch panel arranged on an upper portion of a liquid crystal monitor. The operation displaying unit 13 has a touch panel arranged on various operation keys and finish image display portion (for example, a liquid crystal display). Through the operation keys and the touch panel, various operations required for performing operations of the image processing apparatus are performed. In particular, image processing on a document image of a document desired by the user to be printed, settings regarding printing conditions, and various setting operations, such as settings regarding post-processing (for example, sorting, stapling, hole punching, etc.), are received.

The preview generating unit 11 may not be configured to generate check icon information, but can be configured to accept a specification of rotation or non-rotation from a setting switch (not shown) through which the operation displaying unit 13 receives the specification.

Figure 2:
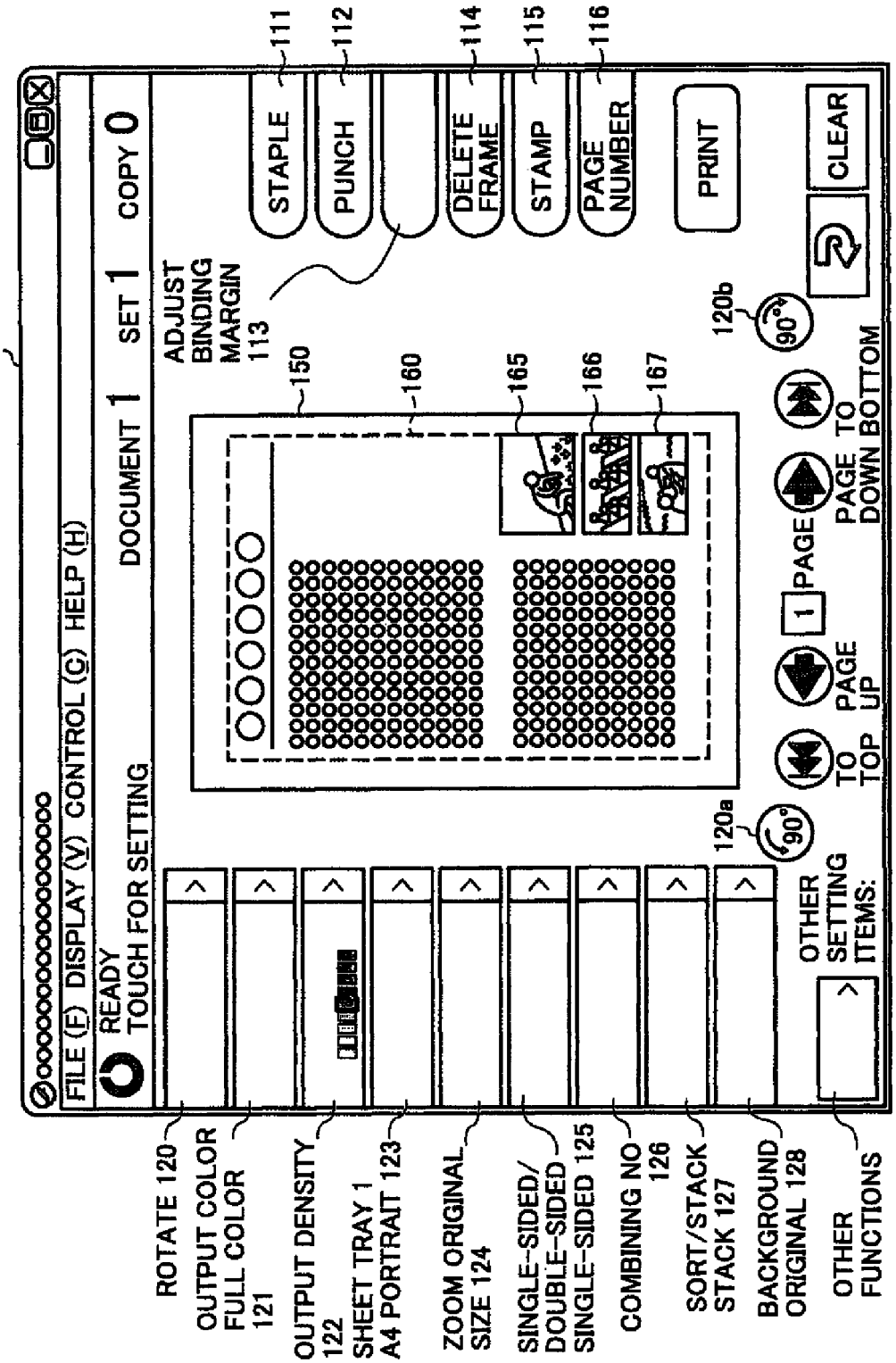
FIG. 2 is a schematic drawing of one example of a preview display of a document in the user interface device according to the first embodiment.

FIG. 2 is a schematic drawing of one example of a preview display of a document in the user interface device according to the first embodiment. The operation displaying unit 13 has a monitor portion 100 on which a preview image 150 is displayed. On the preview image 150, a region meaningful as information is a region 160 surrounded by a dotted line, on which document images and photographic images 165 to 167 are displayed.

Also, as depicted in FIG. 2, the operation displaying unit 13 has various process items for input information displayed thereon at right, including staple 111, punch 112, adjust binding margin 113, delete frame 114, stamp 115, and page number 116.

Furthermore, the operation displaying unit 13 has process items displayed thereon at left, including rotate 120, output color 121, output density 122, sheet 123, enlarge/reduce 124, single side/duplex 125, combine 126, sort/stack 127, and background 128. Still further, icons for accepting a rotation operation are displayed as rotation icons 120a and 120b. These accept an input through a touch, but may be shaped in buttons for accepting a process and located at portions other than the display portion.

Figure 3:
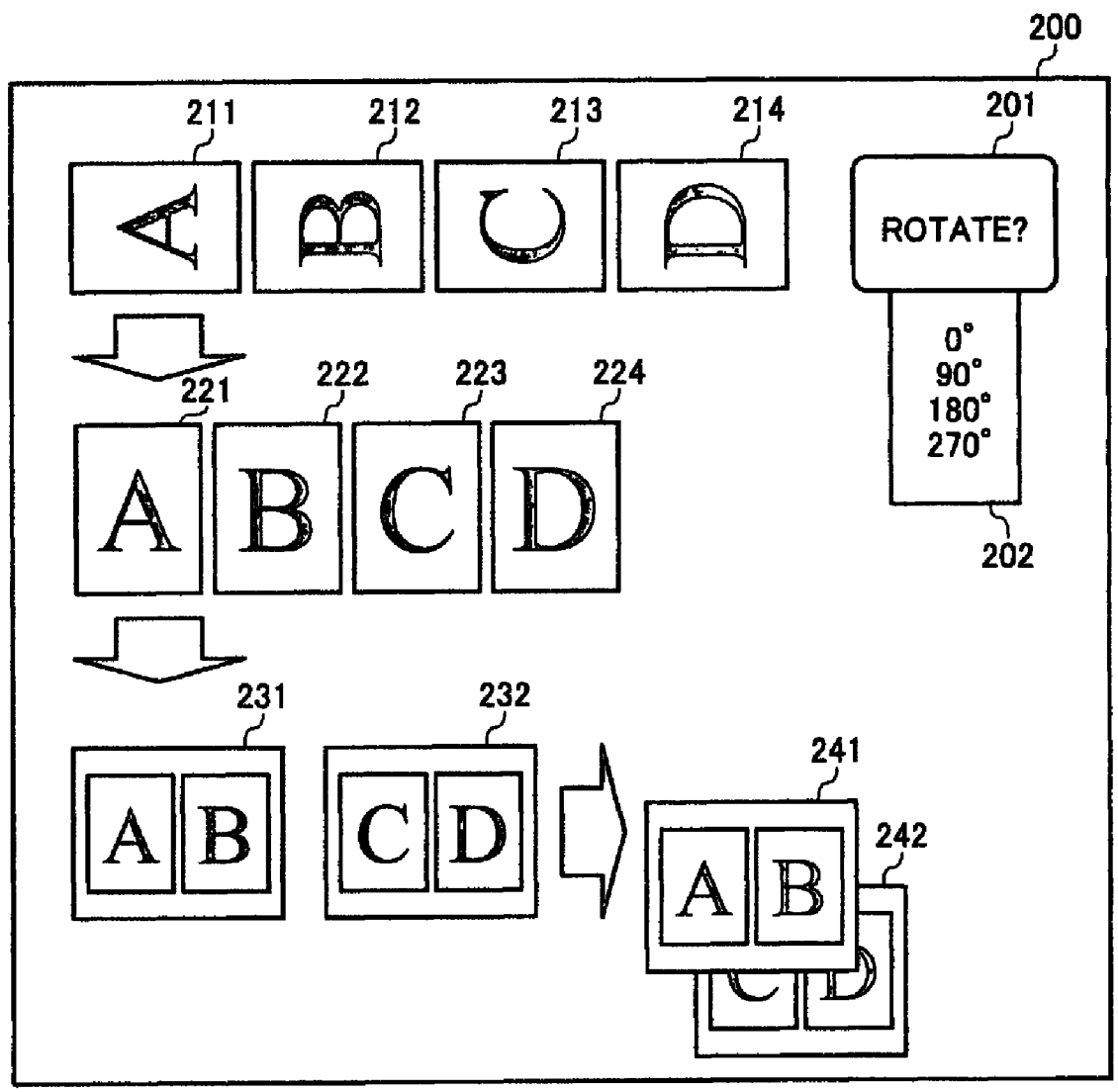
FIG. 3 is a drawing for explaining that a preview image is displayed to accept a rotation process.

FIG. 3 is a drawing for explaining that a preview image is displayed to accept a rotation process. A plurality of sheets of a document read by the scanner 1 are displayed as preview images 211 to 214 on the operation displaying unit 13. Simultaneously, a check icon 201 indicative of information for suggesting to the operator whether to perform a rotation process is displayed. On the check icon 201, rotation angles 0, 90, 180, and 270 degrees (denoted by a reference numeral 202) are displayed. Here, the angles represent degrees of rotation in a clockwise direction. When the image is rotated at right angle, information indicative of 90 degrees is input by touch.

When a rotation process is not performed, 0 degree is input by touch. This is because that the operator is caused to check no rotation process contributes to prevention of an error operation. Other than such a 0-degree display, a direct display of "non-rotation" may be presented for requesting an input.

The operation displaying unit 13 detects a touch input of 90-degree rotation by the operator. According to this touch input detected by the operation displaying unit 13, the display control unit 12 performs a rotation process on the preview image information, and then again displays the images 221 to 224 after rotation. Here, when combined printing is set, sheets each containing two images on preview display are horizontally displayed with their vertical orientations being aligned (reference numerals 231 and 232). Then, when a switch (not shown) for performing switching is pressed, preview images 241 and 242 schematically indicating that these sheets are printed as being stacked are displayed on the screen, thereby informing the operation of an output state. The display control unit 12 sequentially stores processed image information after a rotation process in the HDD 5.

Figure 4:
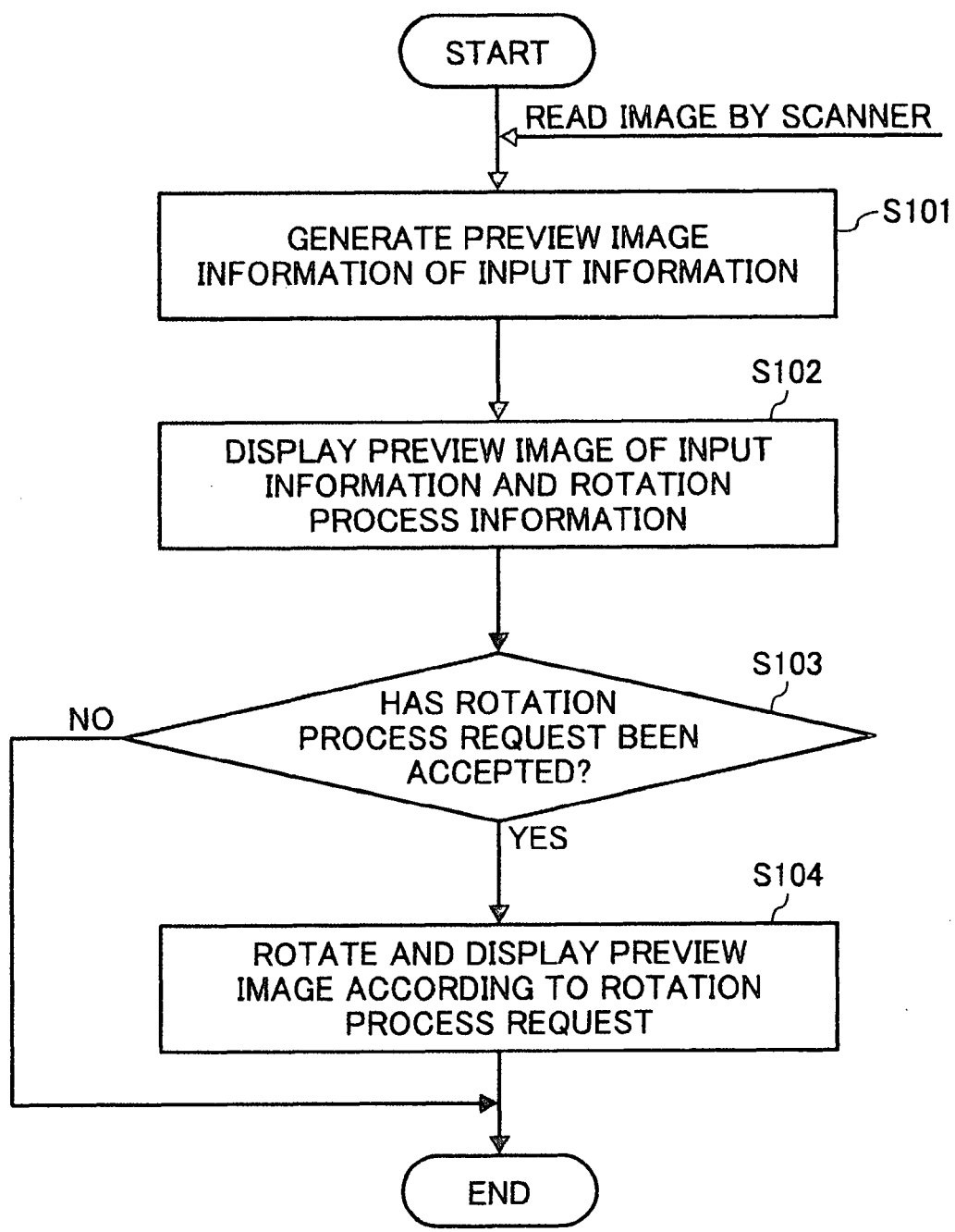
FIG. 4 is a flowchart for explaining a preview image displaying procedure in the user interface device according to the first embodiment.

FIG. 4 is a flowchart for explaining a preview image displaying procedure in the user interface device according to the first embodiment. In the user interface device, firstly, when the scanner 1 first reads image information and the image processing unit 2 converts it to image information, the preview generating unit 11 generates preview image information for display on the operation displaying unit 13 (step S101). Here, the preview image information can be generated by decimating information to reduce the amount of information from the input information obtained through reading by the scanner 1 and conversion by the image processing unit 2 to digital information.

The display control unit 12 causes the preview image of the input information generated by the preview generating unit 11 to be displayed on the operation displaying unit 13, and also causes rotation process information (denoted by the reference numeral 202) to be displayed for accepting a rotation process on the preview image (step S102), thereby accepting a rotation process request through the displayed rotation process information 202 (step S103).

If the operation displaying unit 13 has received a rotation process request ("Yes" at step S103), the display control unit 12 performs a rotation process on the preview image information according to the rotation process request received by the operation displaying unit 13, and then causes the preview image after the rotation process to be again displayed on the operation displaying unit 13 (step S104). If the operation displaying unit 13 has not received a rotation process request ("No" at step S103), the procedure directly ends to makes a transition to printing and other processes. Here, if a request for 0-degree rotation is received, non-rotation is assumed to be specified.

In this manner, according to the user interface device according to the first embodiment, a preview image is displayed, and then a check whether the vertical orientation of the image is correct is presented on the operation displaying unit 13 to draw attention from the operator. Also, a rotation process is received, and the rotated image after the rotation process is again displayed. With this, it is possible to prevent a waste due to an erroneous operation of reading a document image and printing the document with its orientation left incorrect.

As depicted in FIG. 3, the configuration can be such that a plurality of pages of preview images are displayed at a glance, a request for collectively rotating these pages is received, and then these pages displayed at a glace on the operation displaying unit 13 are collectively rotated.

Also, the configuration can be such that a plurality of pages of preview images are displayed at a glance, and for each page, a separate rotation process request is received for rotating each page.

Furthermore, the operation displaying unit 13 can be configured in a manner such that preview images displayed at a glance are displayed in a predetermined order and a rotation movement request for a plurality of pages is received. For example, odd-numbered pages and even-numbered pages are respectively on preview display with their orientation being reversed.

Still further, the configuration can be such that, in the state in which odd-numbered pages and even-numbered pages are displayed with their orientation being reversed, a setting of collectively rotating only the even-numbered pages by 180 degrees and the display control unit 12 rotates these pages according to the received rotation request for display.

In this manner, if an arrangement of orientation has regularity according to the order of the read document sheets, a rotation process is desirably performed according to this regularity.

Figure 5:
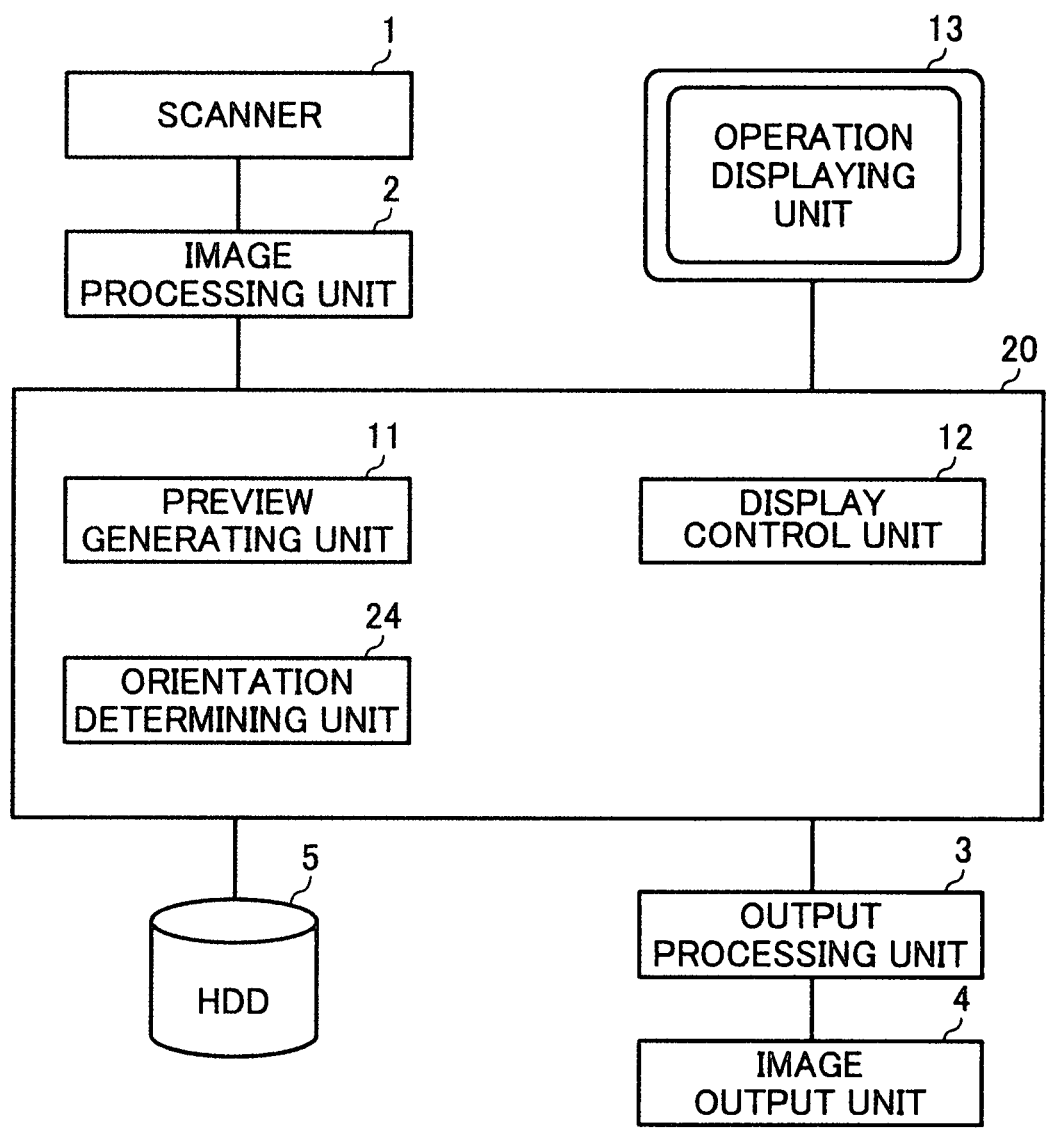
FIG. 5 is a functional block diagram of a user interface device according to a second embodiment of the present invention.

FIG. 5 is a functional block diagram of a user interface device according to a second embodiment of the present invention. The user interface device 20 according to the second embodiment is different from that according to the first embodiment in that an orientation determining unit 24 that determines a vertical orientation of a preview image is further provided, and that the display control unit 12 rotates and moves the preview image according to the orientation determined by the orientation determining unit 24 and then causes the rotated image to be displayed on the operation displaying unit 13.

The orientation determining unit 24 analyzes the input image data to determine a type of the image from out of a character image, a photographic image, a chart image, and other images and, based on the analysis result, determines the vertical orientation regarding the image information.

For example, when determining the image as being a character image, the orientation determining unit 24 recognizes characters through a character recognition function to determine the orientation. Alternatively, when determining that page numbers are added, the positions of the page numbers and the numbers themselves are recognized to determine the orientation. Also, when determining the image as being a photographic image, coloration is analyzed to determine the orientation depending on the degree of blue of the sky.

Still alternatively, when determining the image as being a photographic image and also determining the image as representing a human face through a face recognition function for determining a human face, the orientation determining unit 24 determines the orientation depending on the position relation of the determined face. Also, by detecting an edge portion and a region with significantly differing densities, the image is detected as a chart image, and the detected chart image is analyzed to determine the orientation. These are known technologies, and therefore are not explained in detail herein.

For example, as depicted in FIG. 3, the orientation determining unit 24 causes the horizontally-oriented preview images 211 to 214 to be displayed in the state where the document has been read. Here, when combined printing of combining two images in a vertically-oriented manner and displaying them in a horizontally-oriented manner is selected, the preview images are rotated according to the orientation determined by the orientation determining unit 24, and the 90-degree rotated preview images (221 to 224) are displayed.

Figure 6:
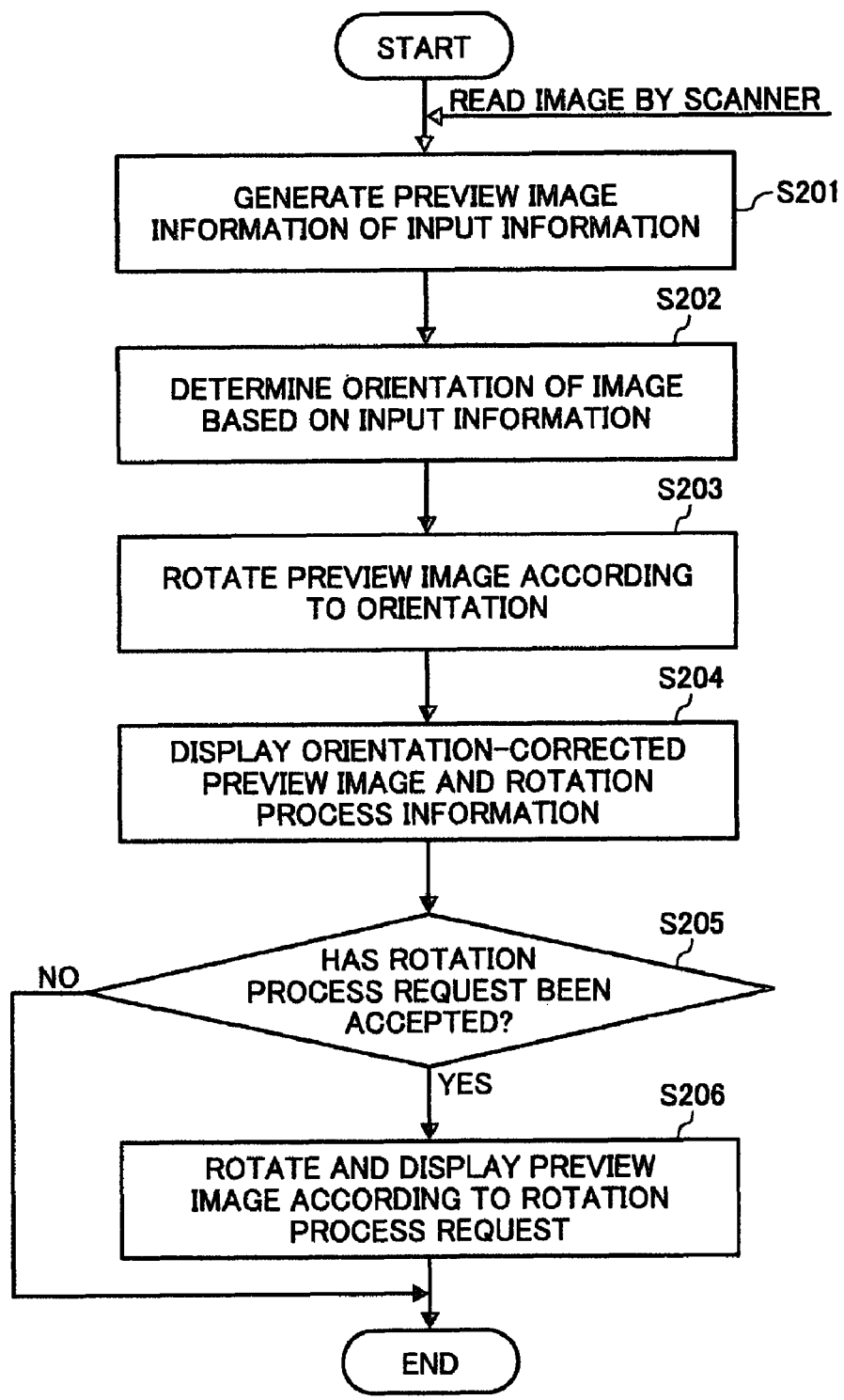
FIG. 6 is a flowchart for explaining a preview image displaying procedure in the user interface device according to the second embodiment.

FIG. 6 is a flowchart for explaining a preview image displaying procedure in the user interface device according to the second embodiment. The preview generating unit 11 generates preview image information from input information (step S201). The orientation determining unit 24 determines the orientation of the image based on the input information (step S202). The display control unit 12 then performs a rotation process on the generated preview image information according to the set print output an item and the orientation determined by the orientation determining unit 24 (step S203), and then causes the result to be displayed on the operation displaying unit 13 (step S204). This step S204 and onward are similar to step S103 and onward in the first embodiment, and are not explained herein.

In this manner, according to the second embodiment, the orientation of the image is automatically determined from the input information, and a preview image is displayed in the determined orientation. With this, the orientation of the image read by the scanner is automatically determined and the image is rotated in a correct orientation for display. With this, it is possible to prevent a waste due to an erroneous operation of reading a document image and printing the document with its orientation left incorrect.

A user interface device according to a third embodiment is different from that according to the first embodiment in that device icons indicative of devices for print media processes including a stapler process, a hole-punching process, and a stamping process or process icons indicative of the state after a print media process are displayed on or near the preview image. The operation displaying unit 13 receives a move request including rotation of any of these icons. According to the move request including rotation of the icon, the display control unit 12 moves the icon with respect to the preview image, and then causes the icon to be displayed on the operation displaying unit 13.

With this, an icon of a device for a process, such as hole punching, or a post-process icon indicative of hole punching has been performed is displayed, and this icon is rotated for display with respect to the preview image. With this, a position regarding a printing process is displayed on the preview screen, and attention of the operator can be drawn to the process through an operation and the position of the orientation of the output image.

A move includes various concepts of moves, including a rotational move and linear translational move. With a rotational move and a linear move, an icon can be moved to a necessary position on the screen. Therefore, a rotational move and a linear move are explained below.

Figure 7:
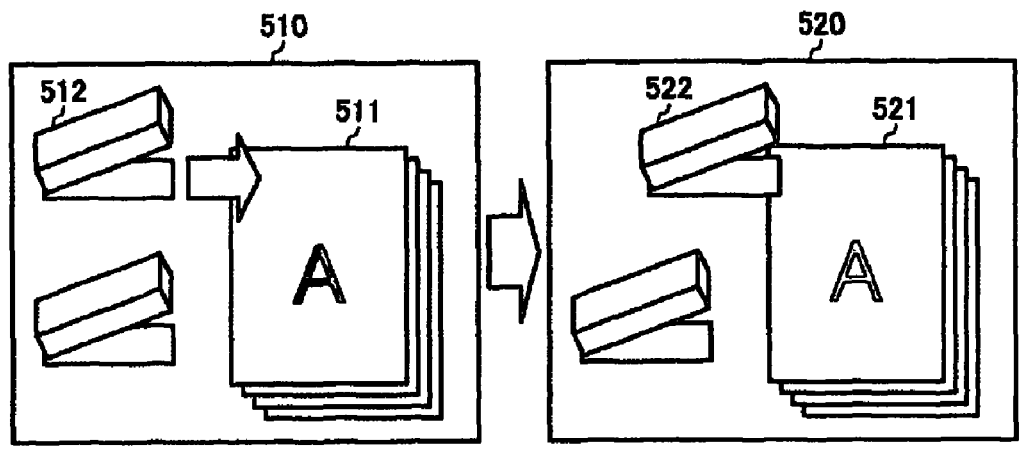
FIG. 7 is a schematic drawing of one example in which a preview image is changed in a user interface device according to a third embodiment of the present invention.

FIG. 7 is a schematic drawing of one example in which a preview image is changed in the user interface device according to the third embodiment. On a screen 510, a preview image 511 is displayed with document images being partially overlapped. That the preview generating unit 11 causes preview image information for each page to be displayed with document images being partially overlapped as explained above is a known technology.

On the preview image 511, the operator touches a displayed stapler 512 with his/her finger or fingers and moves it to the position of a stapler 522. On the preview image, it is possible to visually recognize that the stapler 522 is going to perform a stapling process on the output images at this position.

Figure 8:
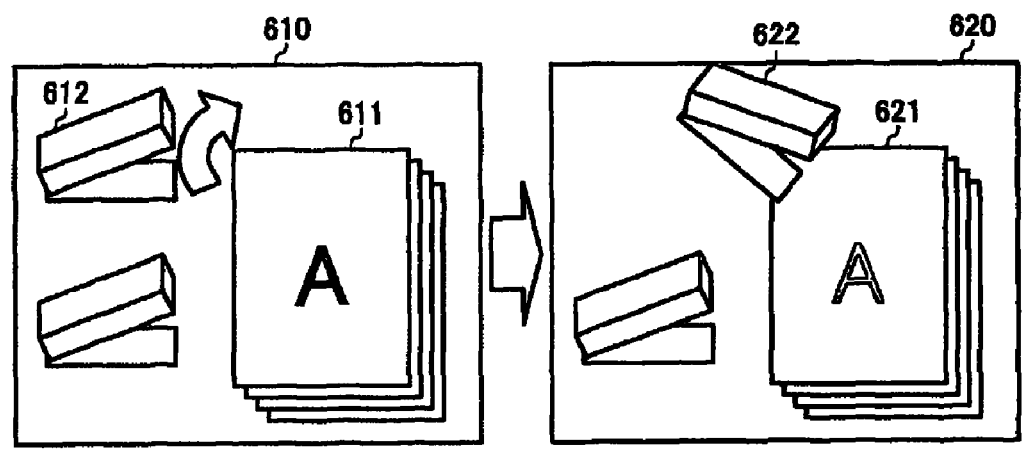
FIG. 8 is a schematic drawing of another example in which a preview image is changed in the user interface device according to the third embodiment.

FIG. 8 is a schematic drawing of another example in which a preview image is changed in the user interface device according to the third embodiment. On a screen 610, a preview image 611 is displayed with a bundle of document images being partially overlapped. The operator touches a staple 612 with his/her finger or fingers and moves and rotate it to the position of a stapler 622. The operation of rotational movement by the operator can be configured in an input manner such that, for example, with two fingers touching on the stapler, the stapler is rotated as if a compass rotates.

Figure 9:
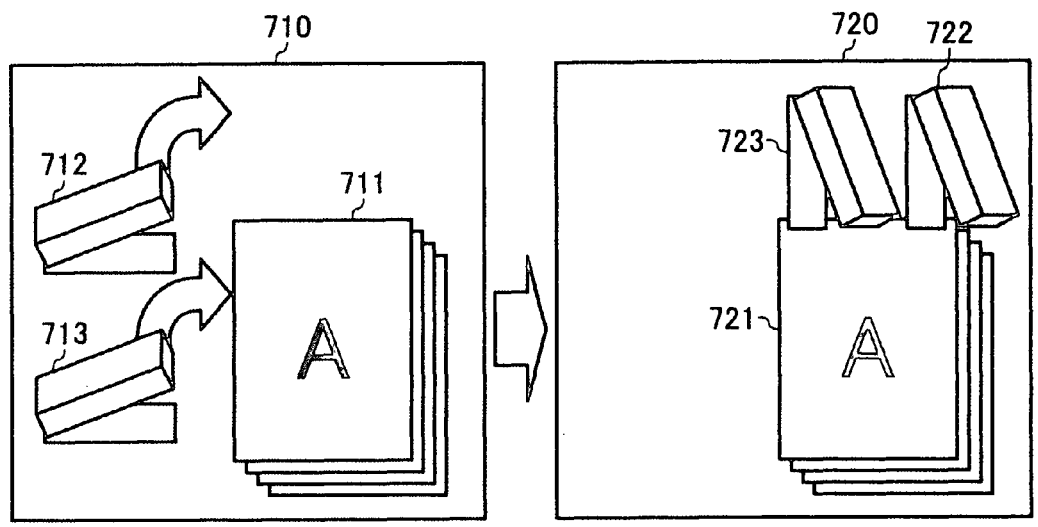
FIG. 9 is a schematic drawing of still another example in which a preview image is changed in the user interface device according to the third embodiment.

FIG. 9 is a schematic drawing of still another example in which a preview image is changed in the user interface device according to the third embodiment. On a screen 710, staplers 712 and 713 are displayed on left where a stapling process is performed on a preview image 711 of a document image. The operator touches these staplers 712 and 713 with his/her finger or fingers to move and rotate these staplers to the staple positions 722 and 723 depicted in an image 720. The movement can be configured in an input manner such that, for example, with two fingers touching these staplers, the staplers are rotated as if a compass rotates.

In this manner, for a preview image, a processing device, such as a stapler, that performs a process after printing is displayed in a form of an icon or the like together with the preview image, and a moving display is received, thereby making it easy to recognize the orientation of the preview image. This makes it possible for the operator to prevent a waste due to an erroneous operation of reading a document image and printing the document with its orientation left incorrect.

Unlike a display in which the icon image explained above is rotated with respect to the preview image of the document, the preview image of the read document may be moved, such as be rotated, for display with reference to the icon image explained above. As a general human operation, when the operation of punching holes is assumed, for example, instead of making holes by moving a puncher with reference to a document, it can occur that the puncher is fixed on a table and the document is moved for processing. As such, a more user-friendly user interface device can be often obtained by matching a display on the operation displaying unit 13 with a natural flow of human operations.

Figure 10:
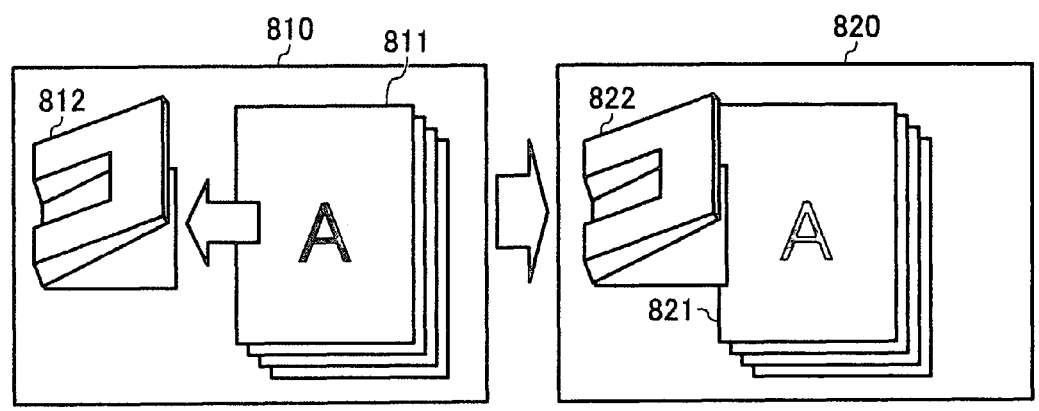
FIG. 10 is a schematic drawing of one example in which a display is changed in the user interface device according to a second modification example.

FIG. 10 is a schematic drawing of one example in which a display is changed in the user interface device according to a second modification example. On a screen 810, with respect to a hole puncher 812, with the operator touching a preview image 811 of a document image with his/her finger or fingers, the preview image 811 is moved to a preview image position 821 displayed on an image 820.

Figure 11:
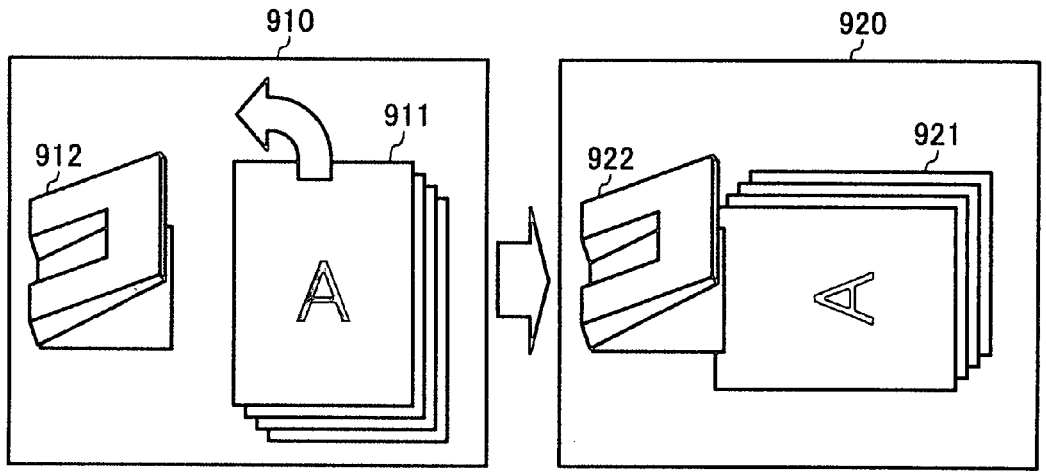
FIG. 11 is a schematic drawing of another example in which a preview image is changed in the user interface device according to the second modification example.

FIG. 11 is a schematic drawing of another example in which a preview image is changed in the user interface device according to the second modification example. On an screen 910, with reference to a hole puncher 912, with the operator touching a preview image 911 of a document image with his/her finger or fingers, the preview image 911 is moved and rotated to a preview image 921 of the document displayed on an image 920.

In this manner, a display pattern is such that with respect of an image of a processing device, such as a hole puncher, the preview image of a document is moved on the operation displaying unit 13. With this, even though an operation on a screen, which is a virtual region, a preview image after the process can be displayed in a sense close to an actual flow of operations of bringing a bundle of printed matter close to the hole puncher. This makes it easy to recognize the orientation of the preview image. Also, it is possible to prevent a waste due to an erroneous operation of reading a document image and printing the document with its orientation left incorrect.

A user interface device according to a fourth embodiment of the present invention is different from that according to the first embodiment in that, when duplex printing is specified for the input information, the display control unit 12 causes a back page to be displayed as a mirror image viewed from the back page on the operation displaying unit 13.

Also, the display control unit 12 performs orientation and mirror-image processes on the preview image of the back page based on the setting of duplex printing and the process settings after printing, and causes the result to be displayed on the operation displaying unit 13.

Figure 12:
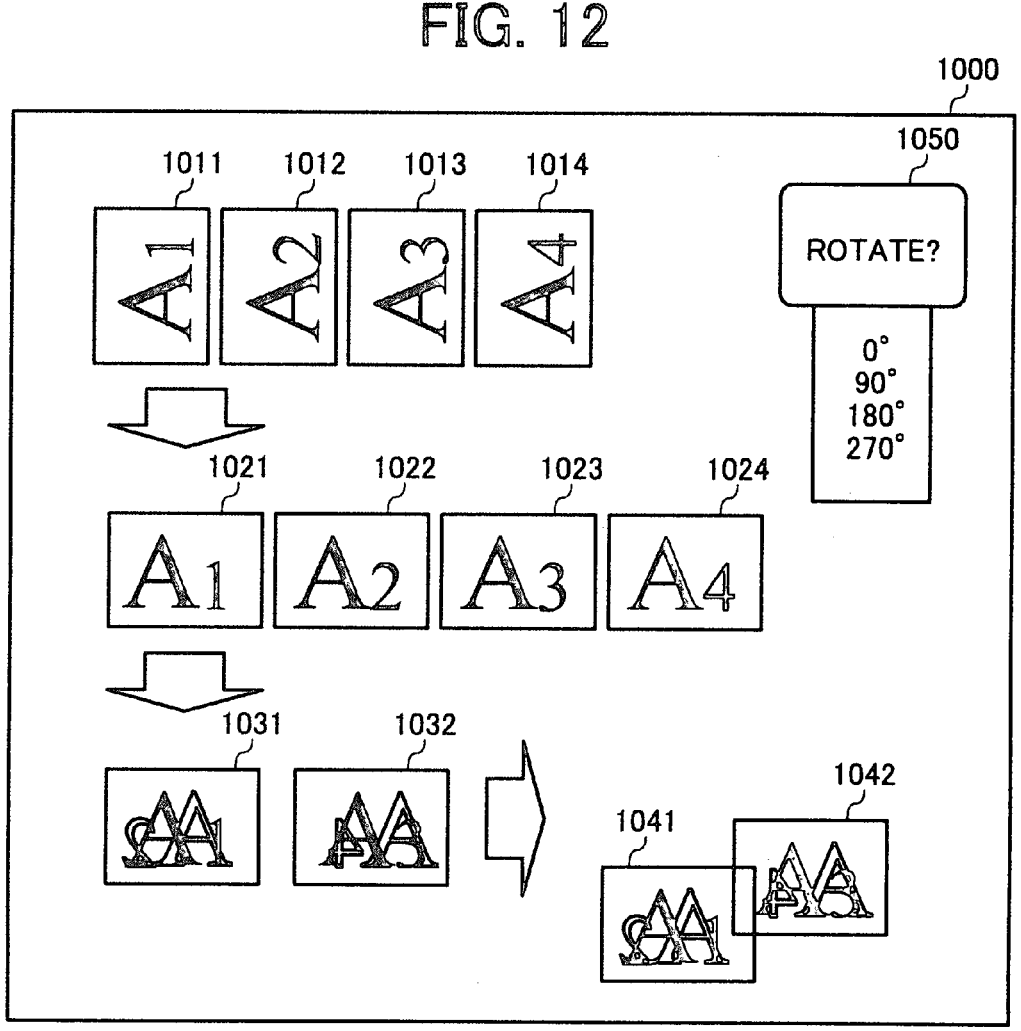
FIG. 12 is a schematic drawing for explaining a display of a preview image in duplex printing in a user interface device according to a fourth embodiment of the present invention.

FIG. 12 is a schematic drawing for explaining a display of a preview image in duplex printing in the user interface device according to the fourth embodiment. For image information obtained through reading by the scanner 1, preview image information is generated by the preview generating unit 11, and is caused to be displayed by the display control unit 12 as images 1011 to 1014 on a screen 1000 of the operation displaying unit 13. Through an input from the operator via a rotation menu 1050, a request for a rotation process is received. The display control unit 12 rotates the preview images and causes them to be displayed as preview images 1021 to 1024.

When detecting that duplex printing is further specified, the display control unit 12 causes a display in a manner such that the preview images 1022 and 1024 corresponding to back pages are subjected to a horizontally-reversed mirror-image conversion process and are then superposed on the preview images 1021 and 1023, respectively (reference numerals 1031 and 1032). Furthermore, when a print input is actually received, preview images 1041 and 1042 are displayed indicating that duplex printing and binding are performed.

Figure 13:
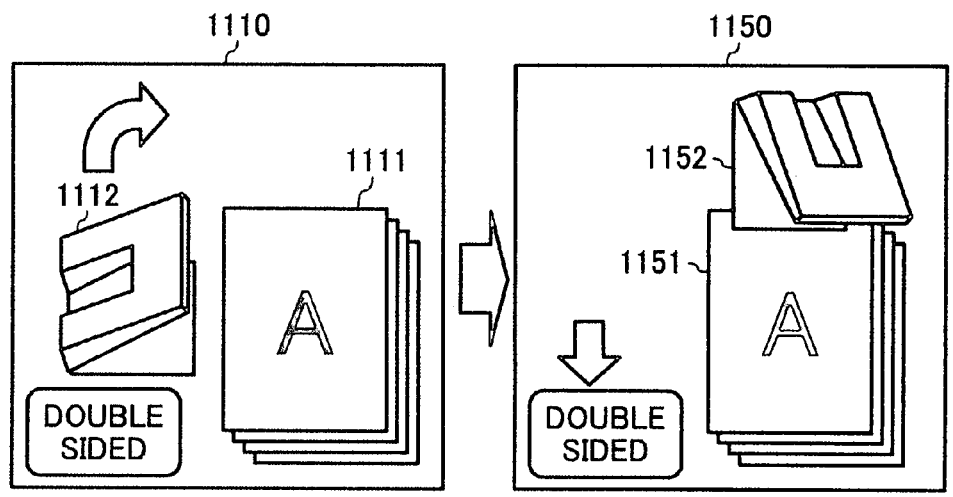
FIG. 13 is a schematic view of a preview image in an operation of punching punch holes on duplex printing.

FIG. 13 is a schematic view of a preview image in an operation of punching punch holes on duplex printing. When duplex printing and hole punching are set, the image information obtained through reading by the scanner are displayed as a preview image 1111 and a hole puncher 1112. Here, the operator touches the hole puncher 1112 with two fingers in a manner as if a circle is drawn with a compass to rotate the hole puncher 1112, and performs a translational movement to move the hole puncher to the position of a hole puncher 1152.

With the display of the image of the hole puncher 1112 and the preview image 1111 of the document, in the case of duplex printing and hole punching, the duplex printing operation can be displayed with a preview image in a sense close to an actual operation method of bringing a hole puncher to a bundle of printed matter. This brings attention to the orientation of the printed image through an operation close to an actual operation. Also, it is possible to prevent a waste due to an erroneous operation of reading a document image and printing the document with its orientation left incorrect.

Figure 14:
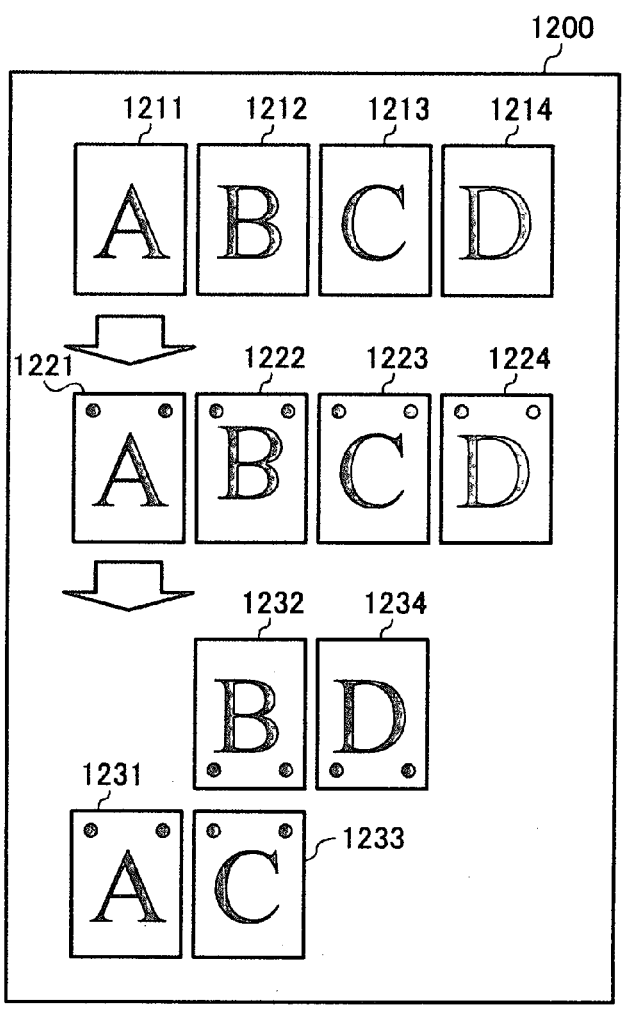
FIG. 14 is a schematic drawing of one example of a process on a preview image in the case of duplex printing and punching punch holes on an upper end.

FIG. 14 is a schematic drawing of one example of a process on a preview image in the case of duplex printing and punching holes on an upper end. FIG. 15 is a schematic drawing of a relation table that determines a preview image process correspondingly to duplex printing and a post-printing process item.

When a document is read, the display control unit 12 causes preview images 1211 to 1214 to be displayed on a display surface 1200. Here, when a process of punching holes on an upper end of the document is specified, the display control unit 12 determines a process of a preview image of each page with reference to the relation table depicted in FIG. 15. From FIG. 15, a hole-punching process is to be performed, and the process position is the upper end. Therefore, from the table, for the first preview image 1211, the display control unit 12 sets the orientation as a forward direction and a non-mirror image. For the next preview image 1212, similarly from the table, the display control unit 12 sets the orientation as a reverse direction and a mirror image.

With these settings, the preview images in duplex printing with hole punching are as preview images 1221 to 1224. Furthermore, preview images 1231 to 1234 in a state where pages are actually turned are preferably displayed. That is, preview images corresponding to the back pages are preferably displayed with the back pages on front. In the case of displaying duplex printing, back pages are preferably displayed in a translucent manner, for example, so as to indicate that they are not front pages.

In this manner, the state of duplex printing after editing are displayed with preview images, with the orientation and mirror-image processes being explicitly depicted. This can provide the operator with an opportunity of checking, and can achieve a user interface device with less waste due to an erroneous operation.

Figure 16:
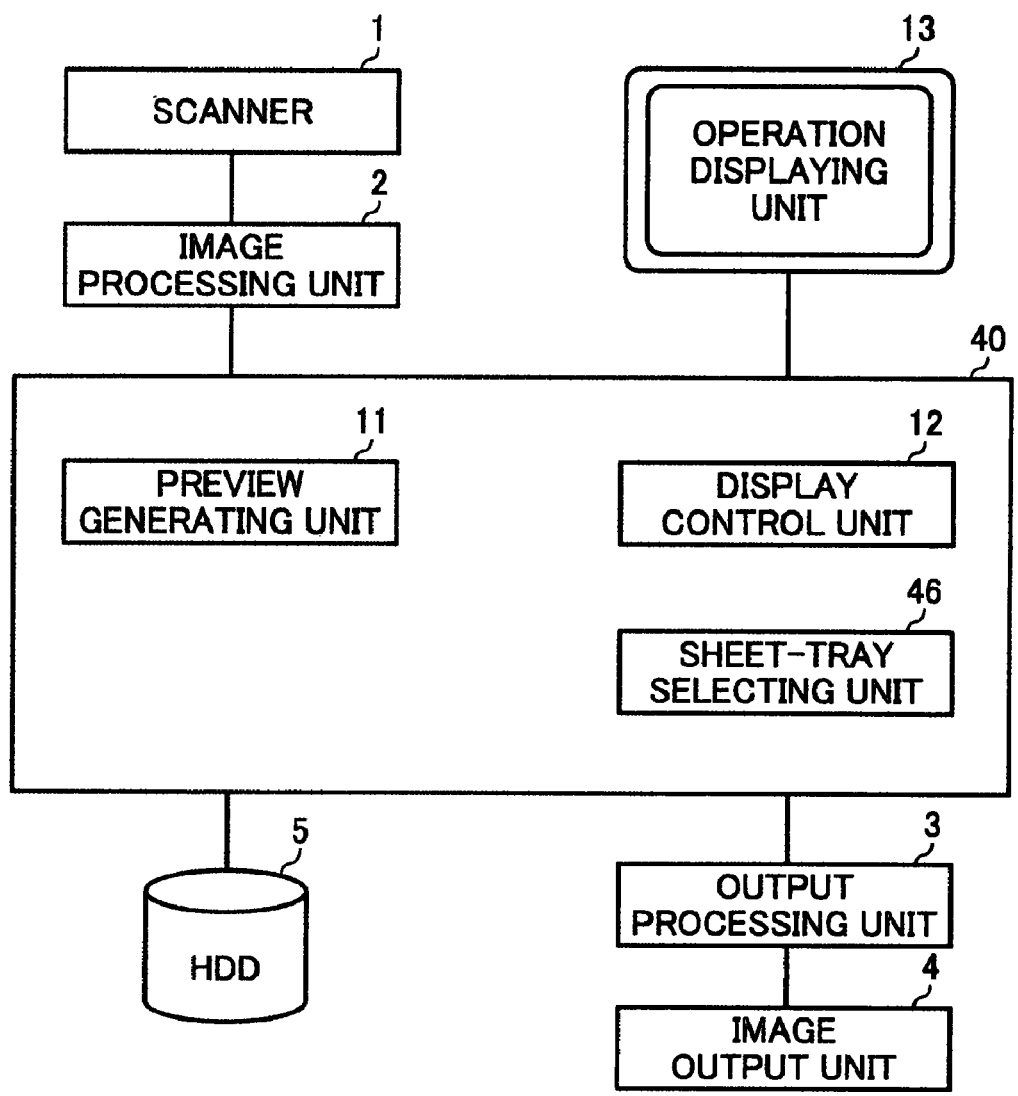
FIG. 16 is a functional block diagram of a user interface device according to a third modification example.

FIG. 16 is a functional block diagram of a user interface device according to a third modification example. The user interface device according to the third modification example further includes a sheet-tray selecting unit 46 that selects an output tray applicable to the orientation of a preview image displayed on the operation displaying unit 13.

By selecting a sheet tray applicable to the orientation depicted by the preview image, applicable printing sheet and the orientation of the sheet can be selected. By selecting a sheet tray, an output medium accommodated in the sheet tray is selected.

The user interface device according to the present invention is applied not only to image forming apparatuses, but can be widely applied to devices, such as digital cameras, printers, and facsimiles, that causes input information to be displayed in preview display on a display screen for image output.

Figure 17:
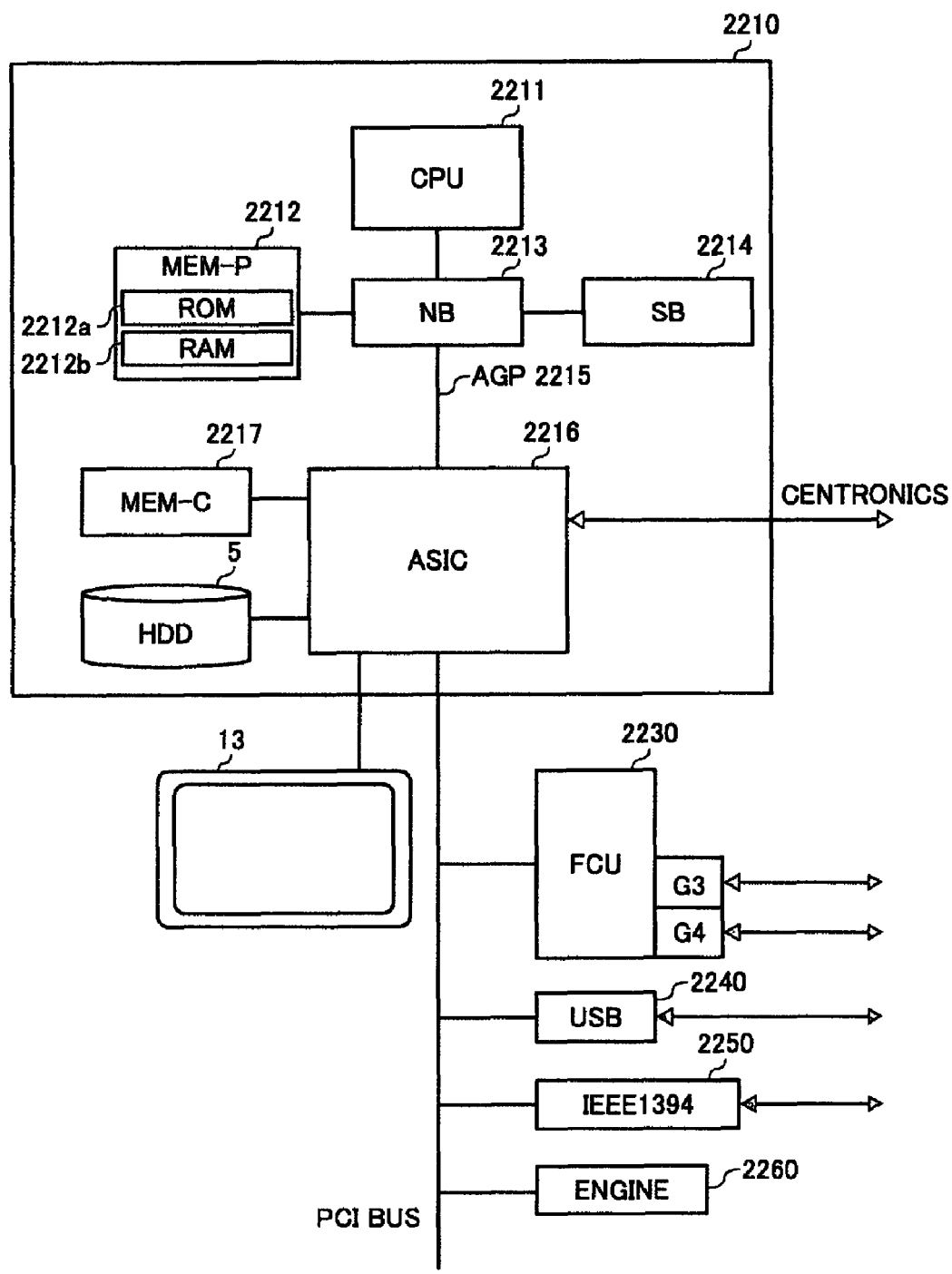
FIG. 17 is a block diagram of a hardware configuration of an image forming apparatus having incorporated therein a user interface device according to the embodiments.
Figure 18:
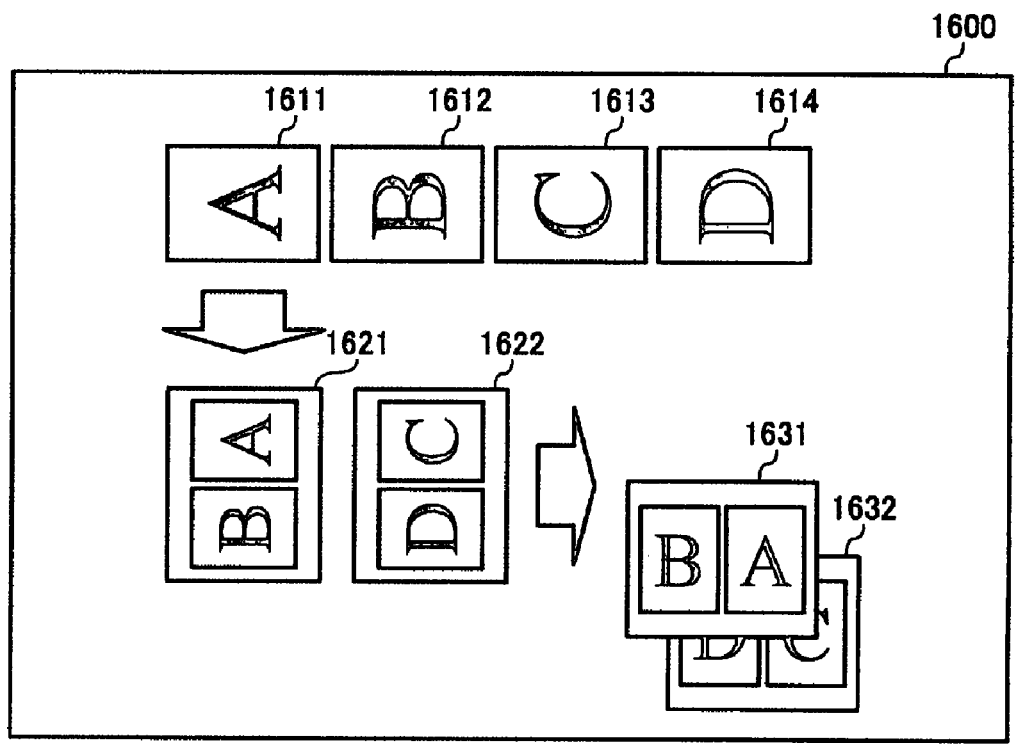
FIG. 18 is a drawing for explaining the case where a document is read by a conventional image forming apparatus for combined printing.
Figure 19:
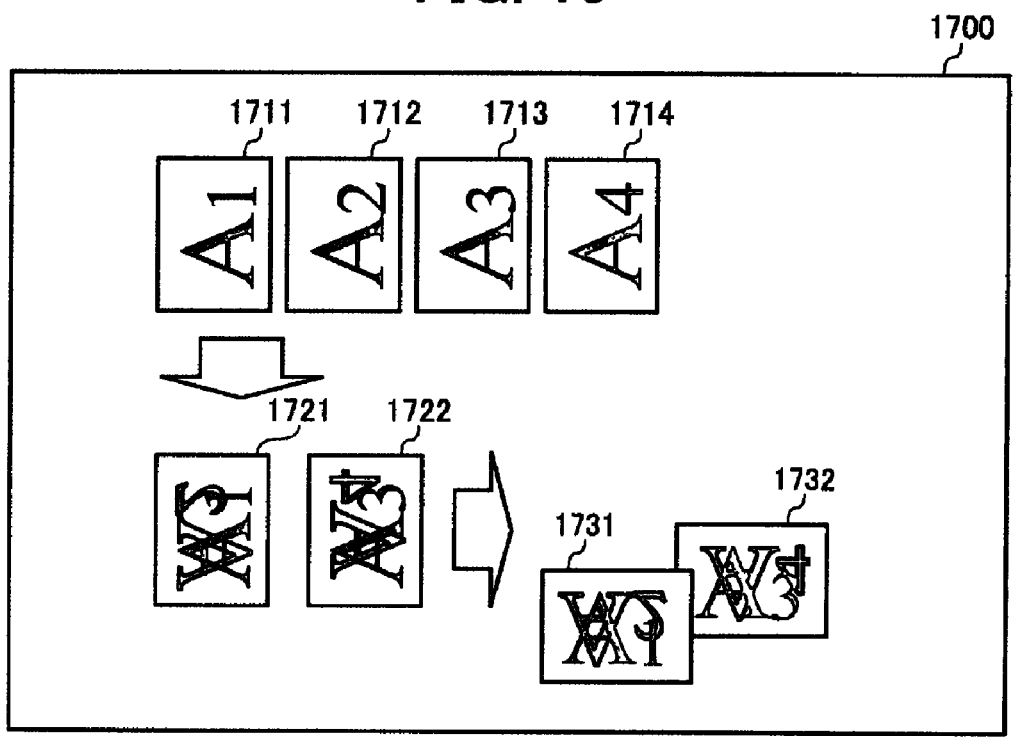
FIG. 19 is a drawing for explaining the case where a document is read by a conventional image forming apparatus for duplex printing.

FIG. 17 is a block diagram of a hardware configuration of an image forming apparatus having incorporated therein the user interface device according to the embodiments. The image forming apparatus is configured to be a multifunction product (MFP) with multifunction, such as facsimile and scanner functions. As depicted in the drawing, this MFP is configured with a controller 2210 and an engine unit 2260 being connected to each other via a peripheral component interconnect (PCI) bus. The controller 2210 is a controller that controls an input from an FCU I/F 2230 and the operation displaying unit 13 by performing, for example, control over the entire MFP, image display control, various controls, and image processing control. The engine unit 2260 is an image processing engine connectable to the PCI bus, and includes, for example, image processing portions for error diffusion, gamma transformation on the obtained image data, and others.

The controller 2210 includes a central processing unit (CPU) 2211, a north bridge (NB) 2213, a system memory (MEM-P) 2212, a south bridge (SB) 2214, a local memory (MEM-C) 2217, an application specific integrated circuit (ASIC) 2216, and the HDD 5, with the NB 2213 and the ASIC 2216 being connected with an accelerated graphics port (AGP) bus 2215. Also, the MEM-P 2212 further includes a read only memory (ROM) 2212a and a RAM 2212b.

The CPU 2211 performs controls over the entire MFP, includes a chip set formed of the NB 2213, the MEM-P 2212, and the SB 2214, and is connected to other devices via this chip set.

The NB 2213 is a bridge for connection of the CPU 2211 with the MEM-P 2212, the SB 2214, and the AGP bus 2215, and includes a memory controller that controls reading and writing with respect to the MEM-P 2212, a PCI master, and an AGP target.

The MEM-P 2212 is a system memory for use as, for example, a memory for storing programs and data or a memory for developing programs and data, and includes the ROM 2212a and the RAM 2212b. The ROM 2212a is a read-only memory for use as a memory for storing programs and data, whilst the RAM 2212b is a writable and readable memory for use as, for example, a memory for developing programs and data or an image rendering memory at the time of image processing.

The SB 2214 is a bridge for connection of the NB 2213 with PCI devices and peripheral devices. The SB 2214 is connected to the NB 2213 via the PCI bus. To this PCI bus, the FCU I/F 2230 is also connected, for example.

The ASIC 2216 is an integrated circuit (IC) dedicated to multimedia information processing, contains hardware components for multimedia information processing, and serves as a bridge for connecting the AGP bus 2215, the PCI bus, the HDD 5, and the MEM-C 2217.

The ASIC 2216 includes a PCI target, an AGP master, an arbiter (ARB), which is a core of the ASIC 2216; a memory controller that controls the MEM-C 2217, and a plurality of direct memory access controllers (DMACs) for image data rotation and others by a hardware logic and others. Between these components included in the ASIC 2216 and the engine unit 2260 via the PCI bus, a universal serial bus (USB) 2240, and the Institute of Electrical and Electronics Engineers (IEEE) 1394 interface 2250 are connected.

The MEM-C 2217 is a local memory for use as an image buffer for transmission or a coding buffer. The HDD 5 is a storage for storing image data, programs, font data, and forms.

The AGP bus 2215 is a bus interface for a graphics accelerator card suggested for increasing the speed of graphic processing, and increases the speed of the graphics accelerator card by directly accessing the MEM-P 2212 with a high throughput.

The operation displaying unit 13 connected to the ASIC 2216 receives an operation input from the operator, and transmits the received operation input information to the ASIC 2216.

Note that the menu displaying program executed on the MFP having incorporated therein the user interface device according to the embodiments is provided as being previously incorporated in a ROM or the like.

The menu displaying program executed on the MFP having incorporated therein the user interface device according to the embodiments may be configured to be provided as being recorded in an installable format or an executable format on a computer-readable recording medium, such as a compact-disk-read only memory (CD-ROM), a flexible disk (FD), a compact disk-recordable (CD-R), or a digital versatile disk (DVD).

Furthermore, the image displaying program executed on the MFP having incorporated therein the user interface device according to the embodiments may be configured to be provided as being stored on a computer connected to a network, such as the Internet, and then being downloaded via the network. Also, the image displaying program executed on the MFP having incorporated therein the user interface device according to the embodiments may be provided or distributed through a network, such as the Internet.

The image displaying program executed on the MFP having incorporated therein the user interface device according to the embodiments has a module configuration including each of the components explained above (the preview generating unit 11, the display control unit 12, the orientation determining unit 24, the sheet-tray selecting unit 46, and others). As actual hardware, with the CPU (processor) reading the image displaying program from the ROM for execution, each unit explained above is loaded onto a main storage device, thereby generating thereon the preview generating unit 11, the display control unit 12, the orientation determining unit 24, the sheet-tray selecting unit 46, and others.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A user interface device comprising:
   a preview generating unit that generates a preview image of input information and rotation-process check information for checking whether to perform a rotation process on the preview image;
   an operation displaying unit that displays thereon (a) the preview image, (b) the rotation-process check information, and (c) setting information for setting details of the rotation process;
   a receiving unit that receives a request for rotating displayed preview image based on the rotation-process check information and the setting information;
   a post-processing unit that receives a setting of post-processing to be processed on an image;

an orientation determining unit that determines an image type of the preview image as any one of a character image type, a photographic image type and a chart image type, and determines a vertical orientation of the preview image based on the determined image type of the preview image; and a processing unit that rotates the displayed preview image in response to (i) the determined vertical orientation of the preview image and (ii) the received request for rotating the displayed preview image and received setting regarding post-processing, and displays the rotated preview image on the operation displaying unit, wherein in a case that duplex printing is specified for the input information including a front page and a back page, the processing unit causes the back page to be processed via a horizontally-reversed mirror-image conversion process to generate a preview back page image, and causes a preview front page image and the preview back page image to be superposed, and causes the superposed preview images to be displayed by the operation displaying unit.

2. The user interface device according to claim 1, wherein the operation displaying unit displays thereon a rotation angle for rotating the displayed preview image, including 0 degree, and the receiving unit receives a request for rotating the displayed preview image at a rotation angle selected based on a display of the rotation angle.

3. The user interface device according to claim 1, wherein the operation displaying unit displays thereon the preview image as a list of a plurality of pages, the receiving unit receives a request for rotating the pages, and the processing unit rotates the list of the pages in response to received request for rotating the pages.

4. The user interface device according to claim 3, wherein the operation displaying unit displays thereon the list of the pages in a predetermined sequence, and the receiving unit receives a request for rotating and moving the pages.

5. The user interface device according to claim 1, wherein the operation displaying unit displays thereon at least one of a device icon indicating a device that performs a finishing process after printing and a process icon indicating a state after the finishing process, together with the preview image, the receiving unit receives a request for moving the at least one of the device icon and the process icon including a rotation of at least one of the device icon and the process icon, and the processing unit moves the at least one of the device icon and the process icon with respect to the preview image in response to received request for moving the at least one of the device icon and the process icon.

6. The user interface device according to claim 1, wherein the operation displaying unit displays thereon at least one of a device icon indicating a device that performs a finishing process after printing and a process icon indicating a state after the finishing process, together with the preview image, the receiving unit receives a request for moving the preview image including a rotation of the preview image, and the processing unit moves the preview image with respect to the at least one of the device icon and the process icon in response to the request for moving the preview image.

7. The user interface device according to claim 1, wherein when a duplex printing is specified for the input information including a front page and a back page, the processing unit displays the preview image corresponding to the back page in a mirror-image display on the operation displaying unit.

8. The user interface device according to claim 7, wherein the processing unit performs at least one of a rotational movement process and a mirror-image process on the preview image corresponding to the back page based on a received operation setting.

9. The user interface device according to claim 1, wherein when a duplex printing is specified for the input information including a front page and a back page, the processing unit displays the preview image corresponding to the back page in a state in which the back page is transformed into a front page on the operation displaying unit.

10. The user interface device according to claim 1, further comprising:

a medium selecting unit that selects an output medium applicable to an orientation of the displayed preview image.

11. The user interface device according to claim 10, wherein the medium selecting unit selects the output medium by selecting a medium tray that accommodates the output medium.

12. The user interface device according to claim 1, wherein the rotated preview image is displayed on the operation displaying unit simultaneously with the rotation-process check information and the setting information for setting details of the rotation process.

13. A method for displaying an image in a user interface device, the method comprising:

generating a preview image of input information and rotation-process check information for checking whether to perform a rotation process on the preview image;

operation displaying on an operation displaying unit (a) the preview image, (b) the rotation-process check information, and (c) setting information for setting details of the rotation process;

receiving a request for rotating displayed preview image based on the rotation-process check information and the setting information;

receiving a setting of post-processing to be processed on an image;

determining an image type of the preview image as any one of a character image type, a photographic image type and a chart image type, and determining a vertical orientation of the preview image based on the determined image type of the preview image; and processing by a processing unit including rotating the displayed preview image in response to (i) the determined vertical orientation of the preview image and (ii) the received request for rotating the displayed preview image and received setting regarding post-processing, displaying the rotated preview image on the operation displaying unit, and in a case that duplex printing is specified for the input information including a front page and a back page, processing the back page via a horizontally-reversed mirror-image conversion process to generate a preview back page image, and superposing a preview front page image and the preview back page image, and causing the superposed preview images to be displayed by the operation displaying unit.

14. The method according to claim 13, wherein
the operation displaying includes the operation displaying unit displaying thereon a rotation angle for rotating the displayed preview image, including 0 degree, and
the receiving includes receiving a request for rotating the displayed preview image at a rotation angle selected based on a display of the rotation angle.

15. The method according to claim 13, wherein
the operation displaying includes the operation displaying unit displaying thereon the preview image as a list of a plurality of pages,
the receiving includes receiving a request for rotating the pages, and
the processing includes the processing unit rotating the list of the pages in response to received request for rotating the pages.

16. The method according to claim 15, wherein
the operation displaying includes the operation displaying unit displaying thereon the list of the pages in a predetermined sequence, and
the receiving includes receiving a request for rotating and moving the pages.

17. The method according to claim 13, wherein
the operation displaying includes the operation displaying unit displaying thereon at least one of a device icon indicating a device that performs a finishing process after printing and a process icon indicating a state after the finishing process, together with the preview image,
the receiving includes receiving a request for moving the at least one of the device icon and the process icon including a rotation of at least one of the device icon and the process icon, and
the processing includes the processing unit moving the at least one of the device icon and the process icon with respect to the preview image in response to received request for moving the at least one of the device icon and the process icon.

18. The method according to claim 13, wherein
the operation displaying includes the operation displaying unit displaying thereon at least one of a device icon indicating a device that performs a finishing process after printing and a process icon indicating a state after the finishing process, together with the preview image,
the receiving includes receiving a request for moving the preview image including a rotation of the preview image, and
the processing includes the processing unit moving the preview image with respect to the at least one of the device icon and the process icon in response to the request for moving the preview image.

19. The method according to claim 13, wherein
when a duplex printing is specified for the input information including a front page and a back page, the processing includes the processing unit displaying the preview image corresponding to the back page in a mirror-image display on the operation displaying unit.

\* \* \* \* \*